Sept. 29, 1936.  L. F. KEELY  2,055,931

DYNAMO-ELECTRIC MACHINE

Filed April 12, 1933  2 Sheets-Sheet 1

Inventor
Leroy F. Keely
By Ira Milton Jones
Attorney

Sept. 29, 1936.   L. F. KEELY   2,055,931
DYNAMO-ELECTRIC MACHINE
Filed April 12, 1933   2 Sheets-Sheet 2

Inventor
Leroy F. Keely
By [signature]
Attorney

Patented Sept. 29, 1936

2,055,931

UNITED STATES PATENT OFFICE 2,055,931

DYNAMO-ELECTRIC MACHINE

Leroy F. Keely, Milwaukee, Wis., assignor to The Louis Allis Company, Milwaukee, Wis., a corporation of Wisconsin Application April 12, 1933, Serial No. 665,698

21 Claims. (Cl. 172—36)

This invention relates to certain new and useful improvements in dynamo electric machines and particularly electric motors, and has as a general object to provide a dynamo electric machine or motor of the open, air ventilated type which has means to positively prevent the entrance into the machine interior of extraneous matter and particularly water or other liquids thrown or splashed against the machine in any manner.

Heretofore, where motor installations were subjected to considerable splashing and dripping water, it has been common practice to use an open motor provided with a protecting enclosure or housing, but such enclosures seriously restrict ventilation and are, therefore, objectionable. Fully enclosed motors have also been used in water saturated atmospheres, but moisture from excessive condensation is trapped within such motors. This, coupled with their required excessive size and/or increased cost makes them doubly objectionable.

The present invention overcomes the above objections in a practical manner and affords maximum protection against the entrance of water and other foreign or extraneous substances into the interior of the motor through the ventilating openings, and accomplishes its objective through a novel arrangement of baffles in the air passages, so disposed with respect to the air passages and each other that regardless of its angle, no straight path exists into the motor interior.

The present invention thus affords an absolutely splash proof motor, and by reason of its novel design obtains this maximum in protection without entailing any increase in the overall size of the motor or in the required active and inactive material, except the weight of the end bells, and without altering its standard rating.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which.

Figure 1:
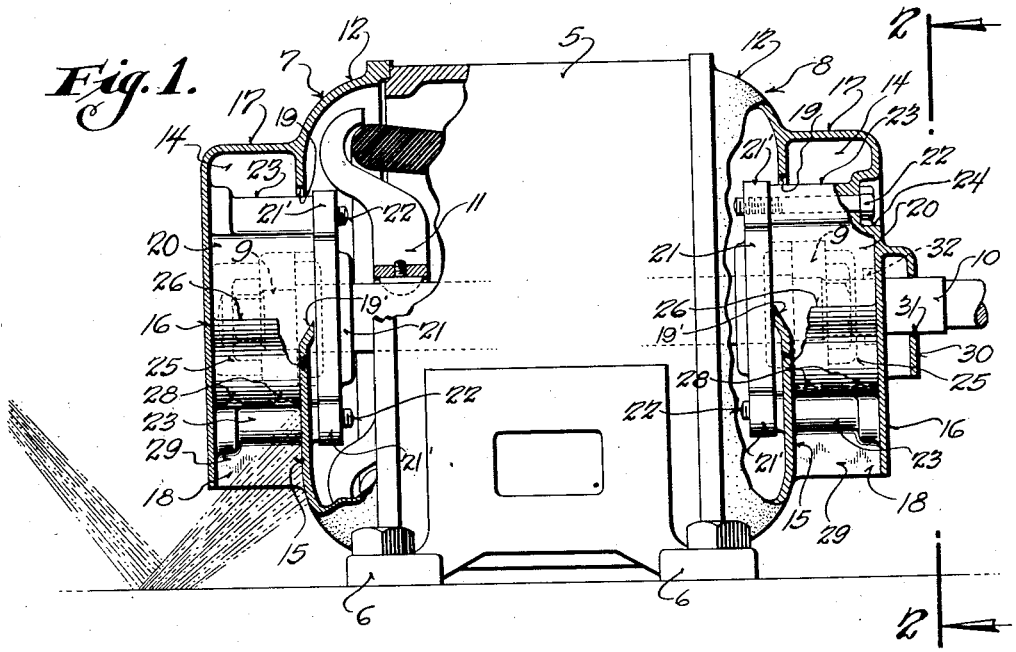
Figure 1 is a side view with portions broken away and in section, of an electric motor embodying this invention.

Referring now more particularly to the accompanying drawings in which like numerals indicate like parts throughout the several views, the numeral 5 represents the supporting frame of a motor of the internally air ventilated type provided with supporting feet 6, by which the motor may be mounted on a suitable base. Attached to the ends of the supporting frame 5 are front and rear end bells 7 and 8 respectively, which, with the frame 5, form the enclosing housing of the motor. The end bells have the customary dish-shaped walls 12, and are held assembled with the frame 5 by cap screws 13 or other suitable fastening means. Bearings 9 are carried by the end bells to mount the shaft 10 of the rotor, one end of which projects from the back end bell.

Both end bells have openings through which the interior of the motor housing is communicated with the outside, and through which the ventilating air passes, being induced to flow through the motor by an air circulating fan 11 fixed to the rotor shaft. The air enters at the front bell 7 and leaves through the rear end bell 8, or vice versa, or the air might be taken and exhausted by other suitable means through the housing or other supporting means.

To guard against the entrance of water or any other extraneous matter into the motor interior through the air inlet and outlet openings in the end bells, each end bell is provided with novel means to afford a tortuous passage through which the air must pass. The arrangement of the walls forming this passage effectually precludes the entrance of liquids or solids into the motor interior, but does not restrict the free passage of air.

This air passage of each end bell is formed in an elliptical chamber 14 bounded by an inner transverse wall 15, which is part of the dish-shaped wall 12, an outer transverse wall 16 and a side wall 17 connecting the transverse walls. At the bottom of the chamber, the wall 17 is interrupted or cut away to provide an opening 18 which affords access to the interior of the chamber.

Communication is established between the air chamber and the interior of the motor through an opening 19 in the inner transverse wall 15. The opening 19 is substantially arcuate and is located near the upper portions of the air chamber. A housing 20 for the bearing 9, extending axially across the space between the transverse walls 15 and 16, defines part of the lower side of the arcuate opening 19.

Figure 3:
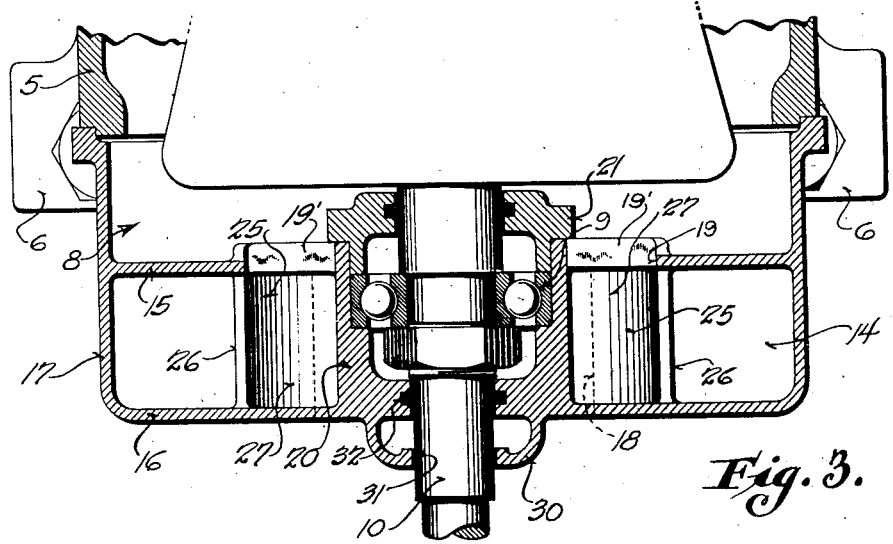
Figure 3 is an enlarged transverse section view through one end portion of the motor taken on the plane of the line 3—3 of Figure 2.
Figure 4:
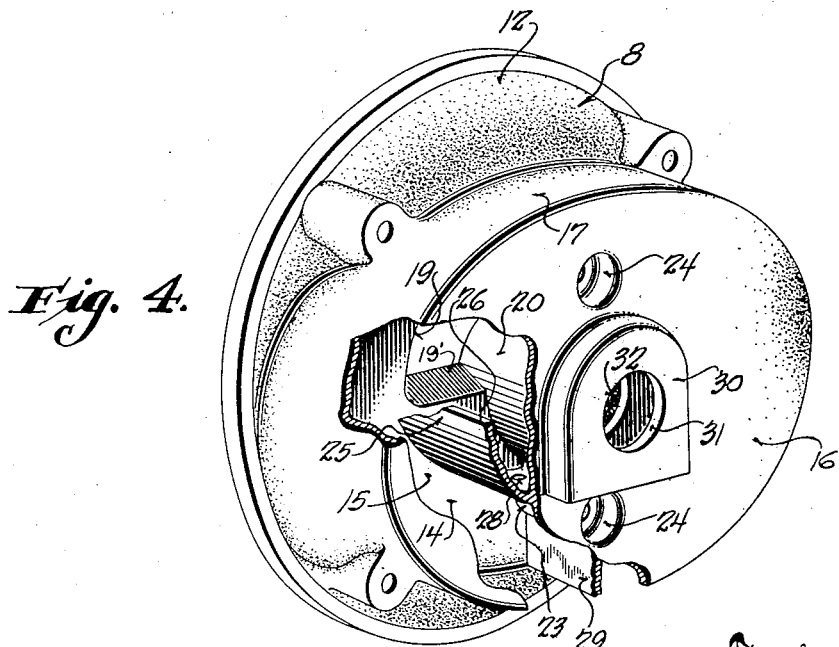
Figure 4 is a perspective view of one end bell of the motor having parts broken away to illustrate its internal construction.

The inner end of the bearing housing projects a short distance inwardly of the wall 15 and is closed by a retainer cap 21 which serves to hold the bearing 9 in the housing, as best shown in Figure 3. Cap screws 22 hold the cap 21 assembled with the bearing housing. The cap screws pass through bores formed in diametrically opposite bosses 23 integral with the top and bottom portions of the bearing housing and are threaded in diametrically opposite extensions 21' projected from the cap 21. The heads of the screws 22 are preferably disposed within recesses or counterbores 24.

Beneath the bearing housing 20 is a baffle wall 25. This wall extends across the space between the inner and outer transverse walls and is substantially concentric to the lower portion of the elliptical side wall 17.

The outer ends 26 of the baffle wall terminate near and preferably outwardly of the lowest portion of the arcuate opening 19 and the medial lower portion of the baffle wall is integrally connected with the adjacent lower portion of the bearing housing. The baffle wall thus cooperates with the inner and outer transverse walls and the opposite sides of the bearing housing to form two collecting chambers 27 in which the liquid deflected from the upper portion of the side wall 17 in a manner to be later described, accumulates to be drained therefrom downwardly and out through the opening 18 through drain openings 28.

A central vertical baffle wall 29 also extends across the space between the inner and outer transverse walls. This vertical baffle wall 29 is located on the vertical axis of the end bell with its lower edge intersecting the mouth of the opening 18. The possible angular range for streams splashed upwardly into the air chamber through the opening 18 is thus materially restricted.

Figure 2:
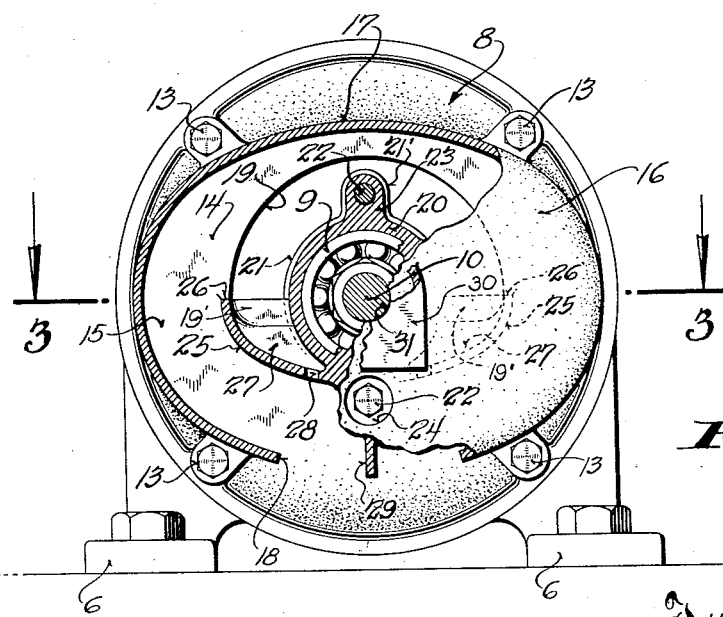
Figure 2 is an end section view taken on the plane of the line 2—2 of Figure 1, also with portions broken away and in section.

From reference to Figure 2 of the drawings, it is apparent that the position and dimensions of the baffle wall 25 are such that no straight path exists from the exterior of the motor through the openings 18 and 19 into the interior of the motor. It is evident that if water is splashed upwardly into the opening 18 as indicated in Figure 1, the stream will be deflected by the baffle wall 25 and directed downwardly, or if it enters the opening 18 at an angle which permits it to pass the baffle wall 25 and strike the upper side portion of the side wall 17, the substantial expanse of the inner transverse wall at the area of possible impingement of such a directed stream will prevent any portion of the deflected water passing through the opening 19. Any such liquid deflected by the side wall 17 will accumulate in the chambers 27 above the baffle wall 25 to be drained through the openings 28.

To further guard against the passage of liquid through the opening 19, the wall 15 directly beneath the opening is inclined inwardly as at 19' to position the lower edge of the opening inwardly of the plane of the wall 15. Hence, any liquid dripping from the upper edge of the opening 19, even though it is deflected inwardly by an inwardly moving current of air, will be caught and directed back into the chambers 27.

Any water which is thrown upwardly through the drain openings 28 will be deflected against the adjacent wall of the bearing housing 20 and thus thrown back into the collecting chambers 27.

The rear end bell through which the shaft end projects is also provided with a guard 30 at the point of egress of the shaft to prevent the entrance of liquid into the bearing chamber as the result of direct streams projected along the shaft toward the end bell. The guard 30 is preferably integral with the outer transverse wall 16 of the end bell and has a substantially inverted U-shape closed at its sides and top. Its outer wall has an opening 31 through which the shaft end 10 projects. It is noted that the opening 31 is substantially no larger in diameter than the opening in the end bell proper so that only a running clearance is afforded between it and the shaft.

The guard functions in the manner of an expansion chamber to break the force of any stream directed along the shaft 10 and passing through the restricted space between the opening 31 and the shaft. After the force of the entering liquid is spent, it falls by gravity or is readily thrown from the shaft by centrifugal force so that practically no liquid reaches the outer wall of the bearing chamber.

A customary felt oil retaining washer 32 in the outer wall of the bearing chamber further guards against the passage of moisture into the bearing housing.

From the foregoing description taken in connection with the accompanying drawings, it will be readily apparent to those skilled in the art to which this invention appertains, that by reason of the novel coaction which exists between the walls defining the air chambers in the end bells and the baffles therein, there is no direct path into the motor interior, and that, therefore, no matter at what angle water or other liquid is splashed or thrown into the air inlet and outlet openings, no portion thereof enters the motor interior; and that this protection against splashing is obtained without in anywise impairing the standard commercial rating of the motor and without increasing its overall dimensions or required active and/or inactive material.

The most effective, economical, and practical protection is thus afforded for motors subjected to splashing and dripping liquids, or falling or flying solid particles. The motor of this invention is, therefore, particularly well adapted for use in dairies, meat packing plants, canneries, breweries, paper mills, boiler rooms, coal yards, sand and gravel pits, machine shops and other similar installations.

It is also apparent that inasmuch as the end bells are symmetrical in construction with reference to their mode of attachment to the motor frame, it is possible to turn the end bells upside down where it is desirable to mount the motor in an inverted position, or at a ninety degree angle for wall mounting.

What I claim as my invention is:

1. In a dynamo electric machine of the internally ventilated type having supporting means including an end bell, the end bell having a transverse wall provided with an air opening into the machine interior, an air chamber formed on the exterior of said transverse wall and comprising, a wall overlying said transverse wall in spaced relation thereto, and connected to said transverse wall by a side wall open at its bottom to afford access to said air chamber, said side wall being spaced a substantial distance from the peripheral edge of the opening in the transverse wall so as to afford a considerable expanse of wall surface at each side of the opening in the transverse wall, and a baffle wall extending across the air chamber beneath the opening in the transverse wall, said baffle wall being so located as to deflect liquids and extraneous matter projected into the air chamber through the entrance at its bottom away from the opening in the transverse wall, and having its side portions extended upwardly to provide a collecting chamber in which liquids and extraneous matter deflected from the side wall of the air chamber above said baffle wall accumulate, and means to drain accumulated liquids and extraneous matter out through said entrance opening.

2. In a dynamo electric machine of the internally ventilated type having supporting means including an end bell, the end bell having a pair of spaced transverse walls, a side wall connecting said spaced transverse walls to define an air chamber, said side wall having an opening at its bottom to afford access into the interior of the chamber, the inner transverse wall having an opening near the top of the chamber to communicate the chamber with the interior of the machine, a bearing housing extending across the space between the transverse walls, and a baffle wall extending across the space between the transverse walls between the bearing housing and the opening at the bottom of the chamber, said baffle wall having its ends turned up and terminating near the opening in the inner transverse wall but extending sidewise sufficiently far with respect to the width of the other opening at the bottom of the chamber to preclude the projection of liquids or extraneous matter in a straight line through the bottom opening and into the opening in the inner transverse wall, said baffle wall also forming a collecting chamber in which liquids and extraneous matter deflected from the upper portion of the air chamber accumulates, and means to drain such liquid and extraneous matter accumulated therein outwardly through the opening in the bottom of the chamber.

3. In a dynamo electric machine of the internally ventilated type having supporting means including an end bell, the end bell having spaced inner and outer transverse walls connected by a side wall contiguous to the peripheral edge of the outer transverse wall, said side wall having an opening to afford access to the chamber formed by said spaced transverse walls and the side wall, the inner transverse wall having an opening to communicate the chamber with the interior of the machine, and a baffle wall extending across the space between the transverse walls and disposed above the opening in the side wall with its ends extending a substantial distance beyond said opening and at least to the side extremities of the opening in the inner transverse wall to prevent a straight path from the opening in the side wall into the machine interior through the opening in the inner transverse wall.

4. In a dynamo electric machine of the internally ventilated type having supporting means including an end bell, the end bell having spaced inner and outer transverse walls connected by a side wall contiguous to the peripheral edge of the outer transverse wall, said side wall having an opening in its bottom portion to afford access to the chamber defined by said spaced transverse walls and the side wall, the inner transverse wall having an opening near the top of the chamber to communicate the chamber with the interior of the machine, and a baffle wall extending across the space between the transverse walls and disposed above the opening in the bottom portion of the side wall with its ends extending a substantial distance beyond the sides of the opening at the bottom of the chamber and at least to the side extremities of the opening in the inner transverse wall to prevent a straight path from the opening in the bottom of the chamber into the machine interior through the opening in the inner transverse wall, said baffle wall having its end portions directed upwardly to form a collecting trough in which liquid and extraneous matter projected into the chamber through the opening in its bottom and deflected by the upper portion of the chamber inner walls accumulates and having a drain opening in its lower portion through which such accumulated liquid and extraneous matter drains outwardly through the opening in the bottom of the chamber.

5. In a dynamo electric machine of the internally ventilated type having supporting means including an end bell, the end bell having an air chamber formed therein, a partition wall dividing the air chamber horizontally into a lower and an upper compartment communicated with each other at opposite ends of the partition wall, the lower compartment having an air opening in its bottom wall and the upper compartment having an air opening in its upper portion leading to the interior of the machine, said partition wall being so situated with respect to the openings in the lower and upper compartments as to prevent a direct path into the interior of the machine, whereby liquid splashed or thrown up into the lower compartment through the opening in its bottom is prevented from passing to the interior of the machine.

6. In a dynamo electric machine of the internally ventilated type having supporting means including an end bell, the end bell having a substantially elliptical air chamber formed by an inner and an outer transverse wall and a side wall contiguous to the edge of the outer transverse wall, said side wall having an opening to afford access into the interior of the air chamber, and the inner transverse wall having an opening to communicate the chamber with the interior of the machine, and a baffle wall substantially parallel to the side wall and extending across the space between the inner and outer transverse walls, whereby said baffle wall forms a collecting chamber, said baffle wall being so situated with respect to the openings of the chamber as to prevent a direct path into the interior of the machine, and means to drain liquid which accumulates in the collecting chamber formed by the baffle wall.

7. In a dynamo electric machine of the internally ventilated type having supporting means including an end bell formed with an air chamber defined by spaced inner and outer transverse walls connected by a side wall, said side wall having an opening in its lower portion to afford access into the air chamber and the inner transverse wall having an opening in its upper portion to communicate the air chamber with the interior of the machine, a baffle wall disposed between said openings to deflect liquid splashed or thrown up into the air chamber through the lower opening and prevent its passage into the machine interior through the upper opening, and a second baffle wall contiguous to the first baffle wall and extending downwardly to the mouth of the lower opening to divide the lower opening and restrict the range of angularity at which liquid can be splashed into the lower opening.

8. In a dynamo electric machine having supporting means including end bells and a rotor having a shaft projecting through an opening in an outer wall of one end bell, guard means to prevent the passage of liquid through said opening comprising, an auxiliary wall spaced from said wall of the end bell and apertured to permit the shaft to pass therethrough, the aperture in the auxiliary wall affording but a running clearance for the shaft so as to allow only a small space encircling the shaft, and imperforate means connecting the sides and top of said auxiliary wall with said wall of the end bell, whereby the auxiliary wall and the imperforate means define an expansion chamber entirely surrounding the point of egress of the shaft from the end bell to break the force of liquid directed along the shaft toward the end bell and prevent its passage through the shaft opening in the wall of the end bell.

9. In a dynamo electric machine having supporting means including end bells and a rotor whose shaft is journalled in bearings carried by the end bells with one end of the shaft projecting through an opening in the outer wall of the end bell, said opening being of such size as to afford running clearance for the shaft, means to prevent the passage of liquid through said opening, comprising means encircling the shaft with substantially the same clearance as afforded between said opening in the outer wall of the end bell and the shaft and in spaced relation to said outer wall of the end bell to break the force of a stream of liquid directed along the shaft toward the end bell.

10. In a dynamo electric machine having supporting means including end bells and a rotor whose shaft is journalled in bearings carried by the end bells with one end of the shaft projecting through an opening in an outer wall of one end bell, said opening being of such size as to afford a running clearance for the shaft, means to prevent the passage of liquid through said opening comprising, a hood mounted on the end bell with a wall spaced from said wall of the end bell and apertured to permit the shaft to pass therethrough, the aperture in the hood likewise affording merely a running clearance for the shaft so that the force of liquid striking the hood and entering the same through the restricted space between the aperture and the shaft is spent in its passage therethrough, and said hood being open at its bottom to permit liquid which passes through said aperture in the hood wall to drain from the hood.

11. In a dynamo electric machine of the internally ventilated type having supporting means including an end bell, the end bell having an air chamber formed therein with an opening communicating with the interior of the machine and an opening leading to the outside atmosphere, and a baffle wall within the air chamber between the two openings and so situated with respect thereto as to preclude a straight path into the machine interior and so situated and dimensioned with respect to the walls of the chamber as to afford spaced passages past the baffle, which passages have a combined area substantially equal to the area of the opening leading to the atmosphere.

12. In a dynamo electric machine of the internally ventilated type having supporting means including a frame and end bells, each end bell being formed with an air chamber having an arrangement of baffles and walls affording a tortuous air passage into the interior of the machine through which air is free to pass while liquid and extraneous matter is excluded from entrance to the interior of the machine, said air chamber having an outer dimension substantially equal to the total diameter of the end bell, and fastening means to secure the end bells to the frame, said fastening means passing through portions of the end bells outside the air chamber.

13. In a dynamo machine of the internally ventilated type having a supporting and enclosing structure including end bells, each of said end bells being formed with an air chamber comprising an inner transverse wall, an outer transverse wall and a side wall connecting said inner and outer transverse walls and contiguous to the peripheral edge of the outer transverse wall, said outer transverse wall being elliptical with its major axis horizontal and its major diameter substantially equal to that of the end bell, whereby the air chamber is of elliptical shape and extends across the full width of the end bell, said air chamber having an outer opening at its bottom leading to the interior thereof and having an inner opening in its upper portion leading to the interior of the machine, and an arrangement of baffles and walls within the air chamber between said openings to preclude the passage of liquid and extraneous matter into the machine interior through said air chamber while permitting adequate passage of air.

14. In a dynamo electric machine of the internally ventilated type having a supporting and enclosing structure including end bells, each of said end bells being formed with an air chamber comprising an inner transverse wall, an outer transverse wall and a side wall connecting said inner and outer transverse walls and contiguous to the peripheral edge of the outer transverse wall, said outer transverse wall being elliptical with its major axis horizontal and its major diameter substantially equal to that of the end bell, whereby the air chamber is of elliptical shape and extends across the full width of the end bell, said air chamber having an outer opening at its bottom leading to the interior thereof and having an inner opening in its upper portion leading to the interior of the machine, an arrangement of baffles and walls within the air chamber between said openings to preclude the passage of liquid and extraneous matter into the machine interior through said air chamber while permitting adequate passage of air, and fastening means passing through portions of the end bell outside the air chamber to secure the end bell in position, said fastening means being so located as to enable the end bell to be mounted in any one of a number of positions so as to enable the outer opening of the air chamber to point downward regardless of the position in which the dynamo electric machine is mounted.

15. In a dynamo electric machine of the internally ventilated type having a supporting and enclosing structure, an air chamber carried by one wall of the supporting and enclosing structure and having an inner wall provided with an opening communicating the interior of the machine with the air chamber and having an opening at its bottom communicating the interior of the chamber with the outside atmosphere, an arrangement of baffles and walls within the air chamber so shaped and situated with respect to each other and the inner and outer openings as to prevent the passage of liquid and extraneous matter through the air chamber and into the interior of the machine while permitting an adequate path for ventilating air, said baffles and walls deflecting any liquid or extraneous matter splashed or thrown into the air chamber at any angle from any possible path leading into the machine interior and draining said liquid and extraneous matter out through the opening in the bottom of the chamber, and said wall in which the inner opening is formed having its portion directly beneath the inner opening and defining the lower peripheral edge thereof spaced inwardly of the plane of said wall and of the upper edge of the opening to return any liquid dripping from the upper edge of the opening and slightly deflected inwardly by moving air currents back into the air chamber.

16. In combination with an enclosure having an outer wall provided with an opening and a shaft projecting from the interior of the enclosure through said opening to be exposed on the exterior of said enclosure, means to preclude the passage of liquid into the enclosure through said opening comprising an arrangement of walls attached to said wall of the enclosure with a part thereof closely surrounding the shaft with but a running clearance outwardly of said wall of the enclosure to break the force of liquid projected along said shaft and to afford a drainable chamber surrounding the shaft at its point of egress from the enclosure through said opening, and wherein any liquid entering said chamber along the shaft leaves the shaft to be drained from said chamber before it reaches the opening in the enclosure wall.

17. In a dynamo electric machine of the internally ventilated type having a supporting and enclosing structure and a stator and a rotor therein, said rotor having a shaft projecting through an opening in one outer wall of the supporting and enclosing structure, means affording an air passageway into the interior of the machine, said passageway having an arrangement of baffles and walls so situated and shaped as to preclude the passage of liquid and extraneous matter through said passageway into the machine interior while affording an adequate air path, and means to preclude the passage of liquid into the machine through the opening through which the rotor shaft projects, comprising an arrangement of walls surrounding the rotor shaft at its point of egress from the housing, one of said walls having an opening through which the shaft projects, which opening has but a running clearance for the shaft so that the space between the shaft and the periphery of the opening is restricted to break the force of liquid projected along the shaft, and said walls affording a drainable expansion chamber in which any liquid flowing along the shaft and passing through the restricted space between the shaft and the periphery of said opening leaves the shaft before reaching the shaft opening in the supporting and enclosing structure of the machine.

18. In a dynamo electric machine, a casing, end bells secured to the opposite ends of the casing, a stator within the casing, a rotor cooperating with the stator, each of said end bells being hollow and having inner and outer walls spaced apart from each other and substantially perpendicular to the axis of the rotor and each end bell having an opening at its lower portion communicating the interior thereof with the outside atmosphere, the inner walls of the hollow end bells having openings substantially above the rotor axis to afford communication between the interior of the casing and the hollow end bells, and barriers forming baffles extending across the space between said inner and outer walls of the hollow end bells and disposed between the openings in the inner walls and the openings in the lower portions of the end bells, said barriers being of such dimensions with respect to the said openings as to prevent a straight path through said openings into the interior of the casing.

19. In a dynamo electric machine, a stator casing, an end bell secured to an end of the stator casing, said end bell being provided with an air chamber having an inner wall closing said end of the stator casing except for an opening in said inner wall extending to a point adjacent the axis of the machine, said chamber in the end bell being open to the atmosphere at its lower portion, and means within the chamber to form a baffle beneath the opening in the inner wall of such dimensions with respect to the size of said opening in the inner wall and the opening in the lower portion of the chamber as to prevent a direct path into the interior of the machine through said openings, whereby liquid splashed or thrown up into the chamber through the opening in the lower portion thereof is prevented from passing to the interior of the machine.

20. In a dynamo electric machine, a stator casing, an end bell secured to the end of the stator casing, said end bell being provided with an air chamber having an inner wall closing the end of the stator casing except for an opening in said inner wall extending above the axis of the machine, said chamber also having an opening to the atmosphere at its lower portion, means within said chamber to divide the opening at the lower portion thereof into a plurality of passages, and baffle means projecting laterally into said passages between the opening at the lower portion of the chamber and the opening in the inner wall of the chamber so located and dimensioned with respect to said openings as to prevent a direct path into the interior of the machine through said openings, whereby liquid splashed or thrown up into the chamber through the divided opening at the lower portion thereof, is prevented from passing into the interior of the machine.

21. In a dynamo electric machine, a casing, an end bell secured to an end of the casing, a stator within the casing, a rotor cooperating with the stator, said end bell being provided with an air chamber having an opening adjacent the upper portion thereof leading to the interior of the casing and another opening in the lower portion thereof leading to the outside atmosphere, a hub disposed within said chamber coaxially with the axis of the rotor, a partition wall within the chamber and projecting downwardly from said hub to divide the lower opening into spaced passages, and baffle means projecting laterally from said hub into said spaced passages beneath the opening leading into the interior of the casing, to deflect liquid and extraneous matter splashed up into said passages and prevent their entrance into the interior of the machine.

LEROY F. KEELY.

DISCLAIMER 2,055,931.—*Leroy F. Keely*, Milwaukee, Wis. DYNAMO-ELECTRIC MACHINE. Patent dated September 29, 1936. Disclaimer filed April 29, 1944, by the inventor; the assignee, *The Louis Allis Company*, assenting.

Hereby enters this disclaimer to claims 12, 18, 19, 20, and 21 of said patent.

[*Official Gazette May 30, 1944.*]